Dec. 29, 1942.  M. P. FRERES  2,306,534

REFRIGERATING SYSTEMS

Filed April 30, 1940  2 Sheets-Sheet 1

INVENTOR

Max P Freres

Patented Dec. 29, 1942

2,306,534

UNITED STATES PATENT OFFICE 2,306,534

REFRIGERATING SYSTEM

Max P. Freres, Chicago, Ill., assignor to Anthony F. Hoesel, Chicago, Ill.

Application April 30, 1940, Serial No. 332,589

2 Claims. (Cl. 62—8)

The present invention relates to the preservation of foodstuffs by means of refrigeration, and especially hydrous food such as meat, etc.

In the refrigeration art it is well known that meats may be kept, in the unfrozen state, for at least limited periods, with adequate refrigeration plus proper air circulation. What is not so generally known, however, is that for the proper preservation of meats a certain constant minimum dehydration must take place; otherwise the surfaces of meat tend to become slimy and present an unsalable appearance, as well as increasing the amount of bacteria thereon.

A retail meat market generally has a large walk-in cooler, where bulk meats are kept and from which the display cases are replenished upon demand.

These walk-in coolers are generally constructed of insulated walls having a heat transfer of approximately .1 B. t. u. per hour per square foot per degree Fahrenheit temperature difference between inside and outside temperatures. This is termed the wall heat inleakage. The total heat load of such a walk-in cooler is the sum of the wall heat inleakage, plus the service load in opening the doors, plus the product load.

For the present purpose, we may disregard the product load since once the product is cooled down there is no further product load.

In general, the service load equals about 25 per cent of the wall heat inleakage; therefore, for our purposes, we shall consider the heat load as being .125 B. t. u. per hour per square foot per degree Fahrenheit temperature difference between the inside and outside of the cooled space.

Since a refrigerating system must have adequate capacity to take care of the maximum heat load and further since these systems are generally intermittently operated on the basis of approximately not over 75 per cent of the total time, we find that the refrigerating capacity, per square foot, would then be computed as .166 B. t. u. per hour per degree Fahrenheit.

Such walk-in coolers are generally operated at 34 degrees Fahrenheit, which with a summer condition of outside temperature of, say, 84 degrees Fahrenheit, gives a temperature difference of 50 degrees Fahrenheit between the inside and outside of the walk-in cooler.

In order to properly refrigerate such a walk-in cooler, as above, the refrigerating capacity would have to be .166 B. t. u. times 50° F., equals 8.3 B. t. u., per hour per square foot of walk-in cooler wall surfaces.

Under the above condition the refrigerating system would operate 45 minutes out of each hour and set up a rather vigorous convection circulation of cooled and dehydrated air within the walk-in cooler.

The term "dehydrated" is here used only in its relative sense as meaning air of only slightly lower dew point than the air immediately surrounding the surfaces of the meat, which is continuously surrendering moisture to such air.

Now many of these retail meat markets are unheated, or at least only partially heated during the winter months, in which the temperature of the air, outside the walk-in cooler, may drop to 50° F., or even less.

Under such winter conditions we find that the temperture difference now becomes 50° F., minus 34° F., equals 16° F., and the hourly heat load per square foot of walk-in cooler wall surface becomes .125 B. t. u. times 16° F., equals 2 B. t. u.

Since the refrigerating system has a capacity of 8.3 B. t. u. per square foot per hour, we now find that instead of operating 75 per cent of the time, as in the summer condition, it only operates 2÷8.3 equals 24 per cent of the time, or 60 times .24 equals 14.4 minutes out of the hour.

During the 45.6 minutes that the refrigeration system is inoperative, we find that the air, inside the walk-in cooler, tends to become stagnated and allow the relative humidity of the air surrounding the meat surfaces to sufficiently increase so that the moisture migrating from inside the meat tends to collect upon the surface thereof and make the same slimy.

In the past there have been several attempts made to reduce the amount of off-time of the refrigeration system during the winter months, and one of them consisted of placing heating means within the walk-in cooler. This operates successfully, although it entails a greater consumption of energy and therefore is wasteful. Another means on installations having multiple cooling units in the walk-in cooler, is to close down one or more of the cooling units, but this can be employed only on such multiple cooling unit installations, and is not applicable to single cooling unit installations. Furthermore, each cooling unit generally serves to maintain its proper air circulation within a restricted portion of the walk-in cooler, and in many instances the sliming is aggravated at such portions having the cooling unit closed down.

With cooling units, of the forced air circulation type, we find applications wherein the forced air circulation during the winter months is decreased during the operation of the refrigeration system, resulting in a more dehydrated air being circulated; and is then increased during the off-time cycle, resulting in a more rapid defrosting of the cooling unit surfaces and a consequent rapid rejection of such defrosted moisture to the sewer.

The present invention contemplates operating a cooling unit, during the summer months, exactly as in the present conventional manner; namely, utilizing the entire amount of heat transfer surface comprising such cooling unit. The on-time cycle would then be 45 minutes, and the off-time cycle would be 15 minutes, for the given conditions.

During the winter time I intend to reduce the effective heat transfer surfaces, of the cooling unit, sufficiently, in the manners subsequently described, so that the cooling action is sufficiently modified, from present conventional practice, that sliming of meats is obviated.

An object of the present invention is to prevent sliming of meats, etc., during conditions of low outside temperature surrounding the compartment in which such meats, etc., are kept.

A further object of the present invention is to provide an improved refrigeration system to accomplish the aforementioned object.

Figure 1:
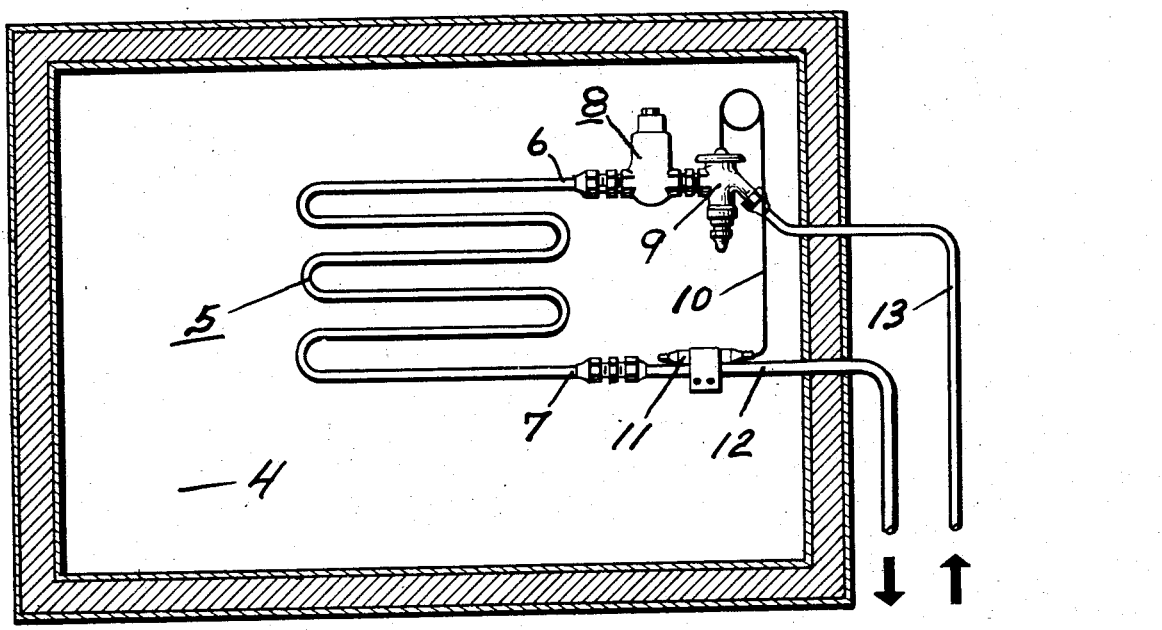
Figure 1 is an elevational diagrammatic view of a refrigerating system, in part, and embodying the invention.

Referring to the drawings:

In Figure 1, a compartment 4 is being cooled by the cooling unit 5, having an inlet 6 and an outlet 7. Connected to the inlet 6 is a pressure differential valve 8 to the inlet of which is connected a thermostatically controlled expansion valve 9, so well known in the refrigerating art that it will suffice to here state that its operation is subject to two forces, one being a force proportional to the superheat of the refrigerant vapor leaving the cooling unit and tending to open the refrigerant feed, through said valve, with increasing superheat and vice versa; the other being a force proportional to the expanded refrigerant pressure within said valve and tending to close the refrigerant feed with increasing refrigerant pressure and vice versa.

From the valve 9, a capillary tube 10 leads to a temperature feeler bulb 11, which comprises, in part, a thermostatically responsive system affecting the refrigerant feed, through valve 9, proportional to the temperature of the refrigerant vapor passing through the suction conduit 12, which connects to the outlet 7, of the cooling unit 5.

A refrigerant liquid conduit 13 connects to the inlet of the valve 9. A refrigerant compressor-condenser system, not shown, serves to evacuate the refrigerant vapor from the suction conduit 12, compress and condense the same, which is then led, under high pressure and in liquid form, to the refrigerant liquid conduit 13.

Figure 2:
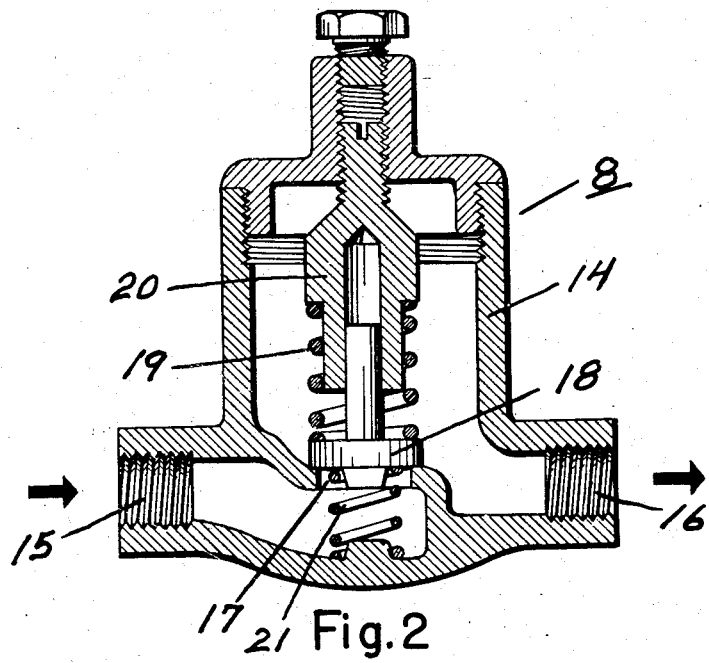
Figure 2 is a cross-sectional view of a pressure differential valve used in the embodiment of the invention shown in Figure 1.

In Figure 2, the differential pressure valve 8 comprises a casing 14 having an inlet 15 and outlet 16 between which is interposed a valve passage 17 having a check valve 18, which is constantly urged into closing position, as shown, by means of the compression spring 19, the length and consequent force of which may be varied by adjustment of the threaded combination valve guide and spring abutment 20.

Assume the system in operation, during the summer period, we now adjust the spring abutment 20 so that the spring 19 is practically free, at which time the compression spring 21 lifts the check valve 18 into full open position and there is then an unrestricted flow passage through the passage 17. The thermostatically controlled expansion valve 9 is now under the direct influence of the refrigerant pressure, within the cooling unit 5, tending to close the feed through the valve 9 with increasing refrigerant pressure. It is further under the influence of the refrigerant vapor temperature, in the suction conduit 12, tending to open the feed, through the valve 9, with increasing temperature.

Assuming that the temperature of the refrigerant liquid, within the cooling unit 5, is 15° F., and that the valve 9 is adjusted to feed refrigerant fluid at such rate as to maintain a 10° F. superheat, we would find that the temperature of the suction conduit 12, adjacent the temperature feeler bulb 11, is now 15° F. plus 10° F., equals 25° F. Under this condition (10° F. superheat) the cooling unit 5 is operating at practically its maximum capacity without having unvaporized refrigerant liquid passing into the suction conduit 12 and to the compressor with all the deleterious effects consequent thereto.

The superheat, previously referred to, is acquired in the following manner:

In order for the cooling unit 5 to absorb heat from the compartment 4, it must be at a lower temperature than the temperature of the compartment 4. Now, if we adjust the valve 9 to maintain a 10° F. superheat, the valve 9 will feed just sufficient refrigerant liquid so that something less than 100% of the surfaces of the cooling unit 5 will produce effective refrigeration, due to vaporization of refrigerant liquid. The remaining percentage of such surface, tending to absorb heat from the compartment 4, then adds heat to the refrigerant vapor. This additional heat is the superheat. The greater the amount of superheat, naturally the greater the amount of surface necessary for the additional heat, and consequently the lesser amount of surface available for effective refrigeration. The converse is also true.

Now as the temperature outside of the compartment 4 decreases, we find that the potential capacity of the cooling unit 5 is relatively too great, which results in too great an off-time period of the refrigerating system, producing sliming of meats, etc.

We now adjust the spring abutment 20 so that the compression spring 19 forces the check valve 18, with some considerable force, to close the passage 17. The check valve 18 now tends to maintain a pressure difference between the inlet 15 and outlet 16. Since the expansion valve 9 connects to the inlet 15 it will be noted that its previous closing force, namely the pressure within the cooling unit 5, is now augmented by the differential pressure necessary to open the check valve 18 against the pressure of the spring 19. In order for the valve 9 to feed refrigerant liquid to the cooling unit 5, it now becomes necessary for the opening force, superheat, to be additionally augmented. Therefore we now find that less of the surface of the cooling unit 5 is producing effective refrigeration, in order that more of such surface can provide the additional superheat.

In effect, the result is just the same as if we had replaced the cooling unit 5 with one of lesser physical dimensions or heat transfer capacity.

While I have shown no means for intermittently operating the refrigeration system, there are just two means, both universally employed and well known in the art. In the first method of control we may employ a room temperature thermostat, which will start the system upon some high compartment temperature and stop the system upon some low compartment temperature. In this instance the temperature of the effective surfaces of the cooling unit 5 during the on-time cycle, would become lower, during the winter time operation, at which time less of the cooling unit surface would be effective, than the temperature of the increased effective surfaces during the summer time operation.

While the operation, with room thermostat control, would tend to have a comparatively long off-time cycle, which was previously mentioned as having an ill effect, we would find that the reduced temperature, of the effective surfaces of the cooling unit 5, would result in a greater dehumidifying effect upon the circulated air during the on-time cycle. In consequence, the ill effects of long off-time cycle are practically canceled by the greater dehumidifying effect of lower temperature on-time cycle.

In the second method of control, which is more generally employed, we utilize a pressurestat, which starts and stops the system responsive to some certain high pressure and some certain low pressure respectively of the refrigerant within the cooling unit 5.

Since volatile refrigerants have a definite pressure-temperature relationship, such pressurestat control method resolves itself into starting and stopping the system at some definite high temperature and definite low temperature respectively of the cooling unit 5. The temperature of the cooled compartment 4, then tends to float with the temperature of the cooling unit 5.

Assuming such pressurestat control set to start the system at, say 33° F. temperature, and stop the same at, say 15° F., we would find, during summer time operation, that the on-time cycle would be comparatively long. Now whenever we adjust the pressure differential valve 8 for winter time operation, we effectively use less of the cooling unit 5. Therefore, the traverse from 33° F. to 15° F. is accomplished in a much shorter period of time than the time period if we utilized the potential maximum capacity of the cooling unit 5.

Whereas utilizing the cooling unit surfaces to their maximum might result in operating cycles of 15 minutes on-time with 45 minutes off-time, we now find that restricting the effective cooling unit surfaces results in operating cycles of possibly 5 minutes on-time with 15 minutes off-time.

Figure 3:
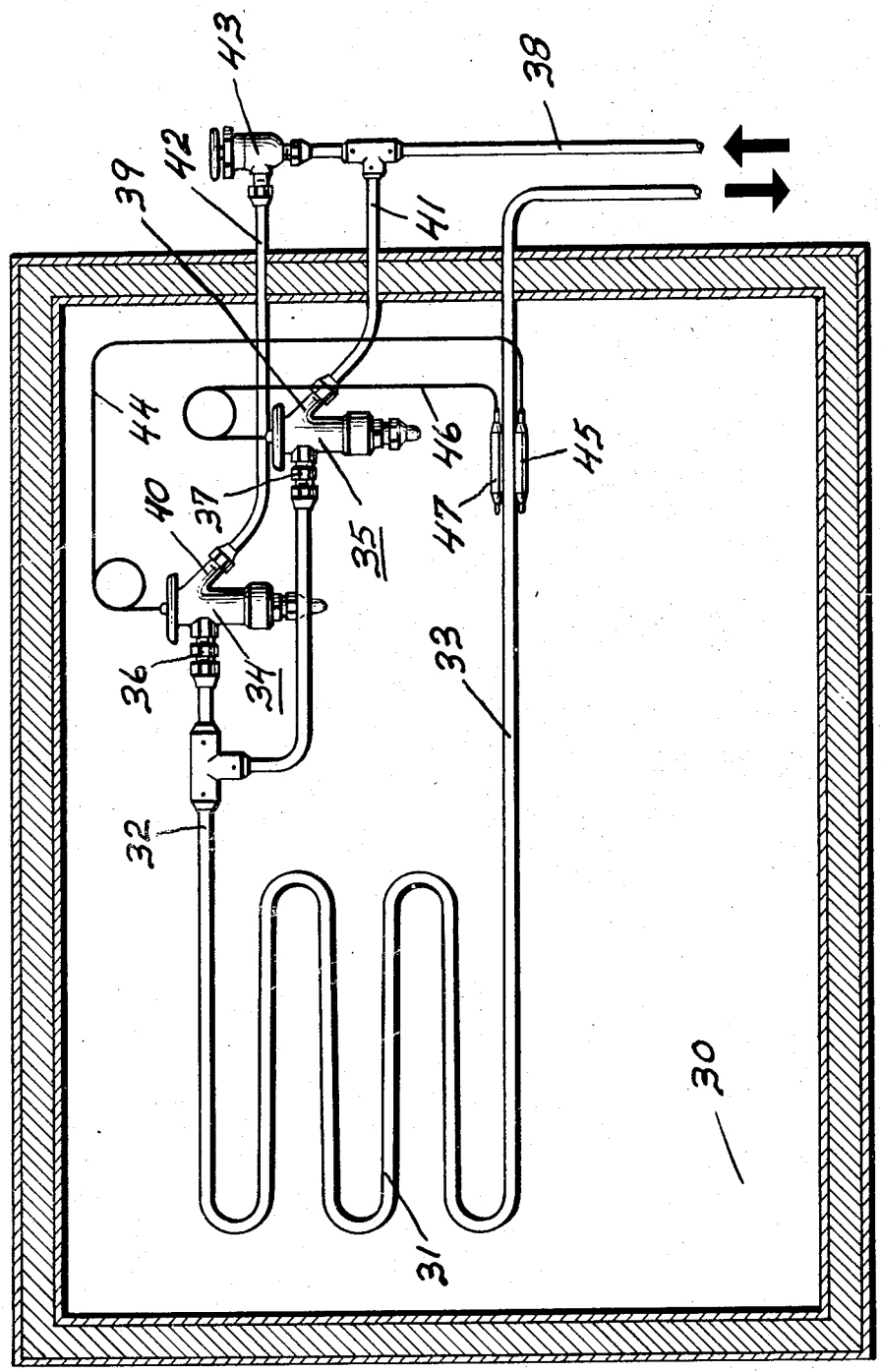
Figure 3 is an elevational diagrammatic view of a refrigeration system, in part, showing a modified form of the invention.

In Figure 3 I show a modified form of the invention, wherein a compartment 30 is cooled by means of a cooling unit 31 having an inlet 32 and outlet 33. The thermostatically controlled expansion valves 34 and 35 have their outlets, 36 and 37, respectively, connected to said inlet 32. The refrigerant liquid conduit 38 connects to the valve inlets 39 and 40 by means of the conduits 41 and 42 respectively. Interposed between the refrigerant liquid conduit 38 and the conduit 42 is a hand operated shut-off valve 43.

Depending from the thermostatically controlled expansion valve 34 is a capillary tube 44 in communication with the temperature feeler bulb 45, adjacent the outlet 33, which forms, in part, the thermostatic control tending to maintain, by means of controlling the rate of refrigerant liquid feed through the valve 34, a 10° F. superheat of the refrigerant vapor passing through the outlet 33. The valve 34 is adjusted to maintain this 10° F. superheat.

Depending from the thermostatically controlled expansion valve 35 is a capillary tube 46 in communication with the temperature feeler bulb 47, adjacent the outlet 33, which forms, in part, the thermostatic control tending to maintain, by means of controlling the rate of refrigerant liquid feed through the valve 35, a greater than 10° F. superheat of the refrigerant vapor passing through the outlet 33. The valve 35 is adjusted to maintain this greater than 10° F. superheat.

The operation is as follows: In the summer time the shut-off valve 43 is placed in open position, which, allowing refrigerant to feed through the valve 34, tends to make practically the entire surfaces, of the cooling unit 31, effective in transferring heat to the refrigerant liquid so fed.

Since the temperature feeler bulb 45 tends to control the feed through the valve 34 so as to maintain a 10° F. superheat, at the outlet 33, the valve 35 cannot feed refrigerant liquid, since it is adjusted to maintain a much higher degree of superheat. Under this condition of operation the valve 35 is closed at all times.

During the winter time the shut-off valve 43 is closed and no refrigerant liquid can therefore feed through the valve 34. In this case the refrigerant liquid feeds through the valve 35 responsive to the temperature of the temperature feeler bulb 47, which, tending to control the feed through the valve 35 so as to maintain a greater than 10° F. superheat, then tends to make only part of the surfaces, of the cooling unit 31, effective in transferring heat to refrigerant liquid. The increased amount of surface, which might relatively be termed ineffective, serves to accumulate the additional superheat added to the refrigerant vapor.

The above numerical value of 10° F. superheat is merely used as a basis of comparison, since that is a rather common point of adjustment in the art. It may range from a lesser degree to even a higher degree in certain instances.

From the above it will be noted that I have provided several manners of regulating a refrigerating system, all based upon varying cooling unit capacity by means of operating the same with various degrees of superheat of the refrigerant vapor leaving such cooling unit.

By this means, I am enabled to so modify the operating characteristics, of a refrigerating system, as to prevent the sliming of meats, etc., during the winter time, while yet having adequate refrigerating capacity for the summer time heat load.

While the above are specific concepts of the invention, many variations, in detail, may be employed without departing from the spirit and scope of the invention, which is to be limited only to the hereto appended claims.

I claim:

1. In a refrigerating system: the combination of a cooling unit having an inlet and an outlet between which a volatile refrigerant is circulated, two expansion valves connected to said inlet and controlling the feed of refrigerant fluid to said cooling unit, two thermostatic means, one individual to each valve, and responsive to temperature conditions at the outlet of the cooling unit, one of said valves being adjusted to maintain a low degree of superheat, the other of said valves being adjusted to maintain a high degree of superheat, and means to close off the fluid flow through the valve adjusted to maintain the low degree of superheat thereby establishing flow through the other of said valves.

2. The combination with a compartment of an intermittently operated refrigerating system for cooling the same; said system comprising a cooling unit having an inlet and an outlet between which a volatile refrigerant is circulated; an expansion valve connected to said inlet and controlling the rate of refrigerant feed, to said cooling unit, responsive to two forces, one force being the pressure of the refrigerant fluid, in said cooling unit, and tending to increase the feed with reducing pressure and vice versa, the other force being responsive to temperature conditions of the refrigerant fluid passing through said outlet and tending to decrease the feed with reducing temperatures and vice versa; and an adjustable pressure differential valve, in said inlet and interposed between said cooling unit and said expansion valve, in order to provide a differential pressure between said cooling unit and said expansion valve and thereby modify the first named force.

MAX P. FRERES.